US010571060B2

(12) United States Patent
Fujii et al.

(10) Patent No.: US 10,571,060 B2
(45) Date of Patent: Feb. 25, 2020

(54) STRUCTURE OF RESIN-MADE PIPE JOINT

(71) Applicant: Nippon Pillar Packing Co., Ltd., Osaka-shi (JP)

(72) Inventors: Makoto Fujii, Osaka (JP); Kazukiyo Teshima, Osaka (JP); Tatsuya Fujii, Osaka (JP); Toshihide Iida, Osaka (JP); Tomoyuki Koike, Osaka (JP); Shintaro Makihata, Osaka (JP)

(73) Assignee: Nippon Pillar Packing Co., Ltd., Osaka-shi (JP)

( * ) Notice: Subject to any disclaimer, the term of this patent is extended or adjusted under 35 U.S.C. 154(b) by 328 days.

(21) Appl. No.: 15/509,891

(22) PCT Filed: Jan. 20, 2016

(86) PCT No.: PCT/JP2016/051502
§ 371 (c)(1),
(2) Date: Mar. 9, 2017

(87) PCT Pub. No.: WO2016/117581
PCT Pub. Date: Jul. 28, 2016

(65) Prior Publication Data
US 2017/0307118 A1    Oct. 26, 2017

(30) Foreign Application Priority Data

Jan. 23, 2015 (JP) .................................. 2015-010851

(51) Int. Cl.
*F16L 33/22* (2006.01)
*F16L 47/04* (2006.01)
*F16L 19/04* (2006.01)

(52) U.S. Cl.
CPC ............. *F16L 33/223* (2013.01); *F16L 19/04* (2013.01); *F16L 19/041* (2013.01); *F16L 47/041* (2019.08)

(58) Field of Classification Search
CPC ......... F16L 33/22; F16L 33/223; F16L 47/04; F16L 19/041
(Continued)

(56) References Cited

U.S. PATENT DOCUMENTS 5,307,995 A * 5/1994 Jackson ................ F16L 33/223
                                                239/373
5,388,871 A * 2/1995 Saitoh .................. F16L 19/0218
                                                285/247

(Continued)

FOREIGN PATENT DOCUMENTS

DE          9114824 U1 *  2/1992  ............ F16L 19/041
EP          0872678 A1 * 10/1998  ............ F16L 33/223
(Continued)

OTHER PUBLICATIONS

International Search Report dated Apr. 12, 2016 in PCT/JP2016/051502 filed Jan. 20, 2016.
(Continued)

*Primary Examiner* — David Bochna
(74) *Attorney, Agent, or Firm* — Oblon, McClelland, Maier & Neustadt, L.L.P.

(57) ABSTRACT

A structure of a resin-made pipe joint includes a sleeve which is press-insertable from one axial side into one longitudinal end portion of a flexible tube to flare the one longitudinal end portion to hold the flared state, a joint body which is couplable to the sleeve, and a union nut which is fastenable to the joint body to hold a state where the sleeve press-inserted into the one longitudinal end portion is coupled to the joint body. The sleeve has a taper-like first outer circumferential surface, a second outer circumferential surface having an outer diameter that is smaller than a maximum outer diameter of the first outer circumferential surface, and an annular step portion which is an annular step portion that is disposed between the first outer circumfer-
(Continued)

ential surface and the second outer circumferential surface and comprises an edge portion on a side of the first outer circumferential surface.

6 Claims, 5 Drawing Sheets

(58) Field of Classification Search
USPC .......................................................... 285/247
See application file for complete search history.

(56) References Cited

U.S. PATENT DOCUMENTS

| | | | | |
|---|---|---|---|---|
| 5,951,060 | A * | 9/1999 | Fukano | F16L 47/04 285/332 |
| 6,045,164 | A | 4/2000 | Nishio | |
| 6,209,804 | B1 * | 4/2001 | Spriegel | F16L 33/223 239/373 |
| 6,347,729 | B1 * | 2/2002 | Spriegel | F16L 33/223 222/409 |
| 6,896,299 | B1 * | 5/2005 | Nishio | F16L 33/223 285/331 |
| 10,132,431 | B2 * | 11/2018 | Fujii | F16L 33/223 |
| 2006/0097517 | A1 * | 5/2006 | Wu | F16L 33/223 285/305 |
| 2006/0138770 | A1 | 6/2006 | Miyajima et al. | |
| 2006/0157975 | A1 * | 7/2006 | Fujii | F16L 47/04 285/247 |
| 2016/0061360 | A1 | 3/2016 | Fujii et al. | |

FOREIGN PATENT DOCUMENTS

| | | | | |
|---|---|---|---|---|
| FR | 2129372 | A7 * | 10/1972 | ............ F16L 33/223 |
| FR | 2394006 | A2 * | 1/1979 | ............ F16L 33/006 |
| JP | 10-54489 | A | 2/1998 | |
| JP | 11-218272 | A | 8/1999 | |
| JP | 2006-200737 | A | 8/2006 | |
| JP | 2010-84914 | A | 4/2010 | |
| JP | 2011-12691 | A | 1/2011 | |
| JP | 2014219053 | A * | 11/2014 | ............ F16L 33/223 |
| WO | WO-0028254 | A1 * | 5/2000 | ............ F16L 33/223 |
| WO | WO 2014/181589 | A1 | 11/2014 | |
| WO | WO-2014181589 | A1 * | 11/2014 | ............ F16L 47/04 |
| WO | WO-2018225044 | A1 * | 12/2018 | ............ F16L 33/22 |

OTHER PUBLICATIONS

Extended European Search Report dated Jul. 24, 2018 in European Patent Application No. 16740188.4, 7 pages.
Office Action dated Sep. 28, 2018 in Korean Patent Application No. 10-2017-7006465 (with English translation), 13 pages.

* cited by examiner

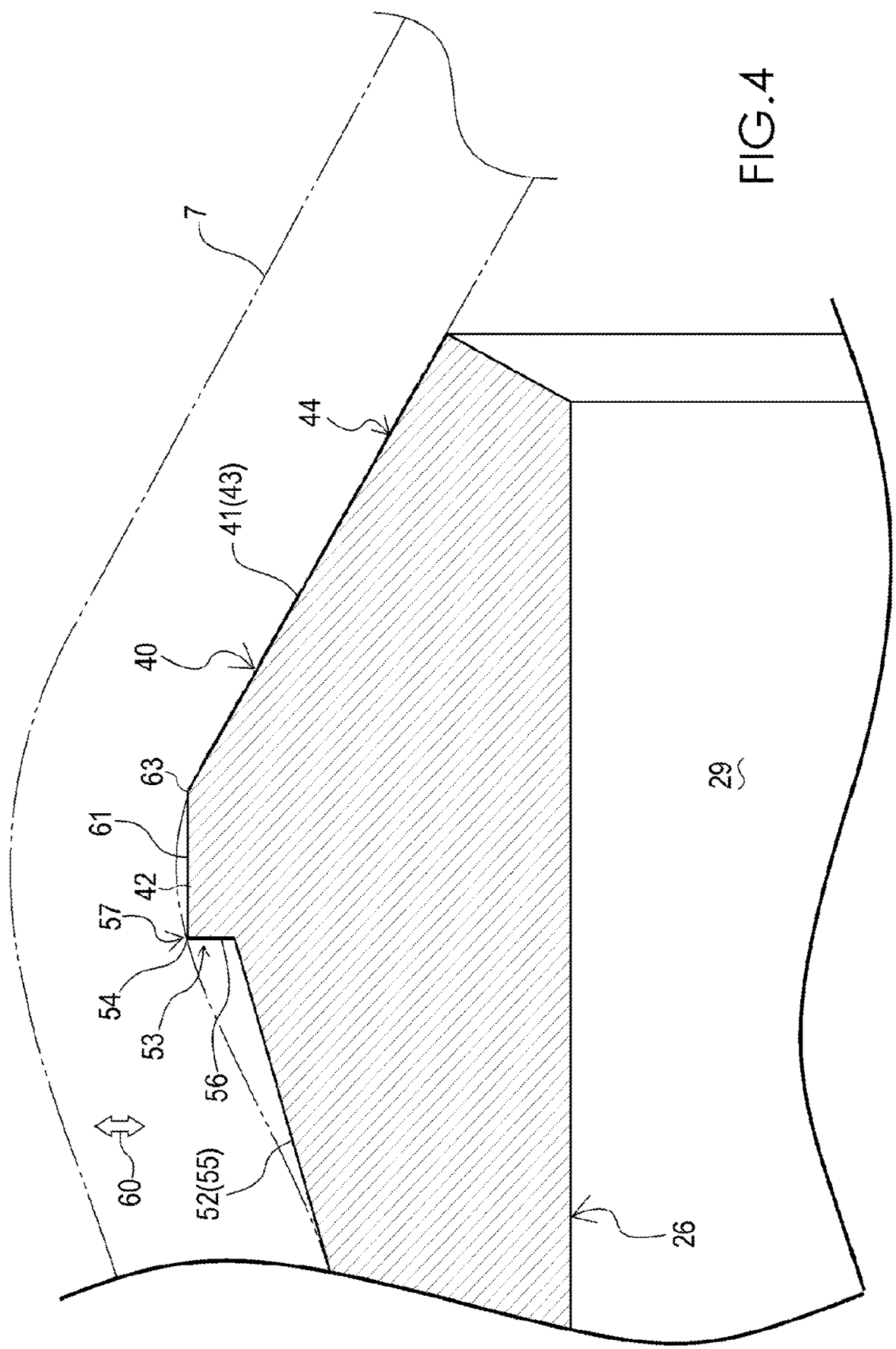

STRUCTURE OF RESIN-MADE PIPE JOINT

TECHNICAL FIELD

The present invention relates to a structure of a resin-made pipe joint.

BACKGROUND ART

As a structure of a resin-made pipe joint which is used for a tube for a fluid (for example, high purity liquid, ultrapure water, or chemical liquid) to be handled in a production process of various technical fields such as production of semiconductor devices, production of medical equipment and medicines, food processing, and chemical industry, for example, a structure of a resin-made pipe joint disclosed in Patent Literature 1 is known.

A structure of a resin-made pipe joint of this kind comprises an inner ring (sleeve), a joint body, and a union nut, and is configured so as to be coupled to a tube by connecting one longitudinal (axial) end portion of the tube, to the joint body through the inner ring, and holding the connection state by the union nut.

Here, the inner ring is configured so as to be press-inserted from the one axial side into the one longitudinal end portion of the tube so that the one longitudinal end portion of the tube that is flexible is flared, and the diameter-increased portion is held. The joint body is configured so as to be able to be coupled to the inner ring.

The union nut can be fitted onto the tube so as to be relatively movable in the longitudinal direction of the tube, and is configured so as to be fastened to the joint body in order to hold the state where the inner ring which is press-inserted into the one longitudinal end portion of the tube is coupled to the joint body.

Then, the inner ring is configured so as to have a taper-like outer circumferential surface that is formed in such a manner that the outer circumferential surface is flared as advancing from the one axial side toward the other side in order to flare the one longitudinal end portion of the tube, and form a sealing portion which seals between the outer circumferential surface and the inner circumferential surface of the one longitudinal end portion of the tube.

When the structure of a resin-made pipe joint and the tube are coupled together, therefore, the sealing portion is formed, and an edge portion of the union nut which is fastened to the joint body causes a part of the one longitudinal end portion of the tube to butt against the outer circumferential surface of the inner ring, thereby enhancing the sealing property of the sealing portion.

In the case where, when the structure of a resin-made pipe joint is used for the tube, the usage environment is under a high-temperature and high-pressure atmosphere or the period of use is prolonged, however, there is a possibility that the fastening force of the nut may be lowered because of the creep phenomenon, and a sufficient sealing property may not be ensured in the sealing portion. In this case, moreover, there is another possibility that the tube may easily slip off the inner ring.

PRIOR ART LITERATURE

Patent Literature

Patent Literature 1: Japanese Patent Application Laid-Open No. 10-54489

SUMMARY OF THE INVENTION

Problems to be Solved by the Invention

The invention has been conducted in view of the above-discussed circumstances. It is an object of the invention to provide a structure of a resin-made pipe joint in which, when the pipe joint is coupled to a tube, the tube hardly slips off, and the sealing property with respect to the tube can be stably ensured.

Means for Solving the Problems

A structure of a resin-made pipe joint in one mode of the invention is a structure of a resin-made pipe joint which comprises:
   a sleeve which is press-insertable from one axial side into one longitudinal end portion of a flexible tube so as to flare the one longitudinal end portion of the tube to hold the flared state;
   a joint body which is couplable to the sleeve; and
   a union nut which is fastenable to the joint body to hold a state where the sleeve that is press-inserted into the one longitudinal end portion of the tube is coupled to the joint body, wherein
   the sleeve has:
   a taper-like first outer circumferential surface which is disposed so as to be further flared as further advancing from the one axial side toward another side in order to flare the one longitudinal end portion of the tube;
   a second outer circumferential surface which has an outer diameter that is smaller than a maximum outer diameter of the first outer circumferential surface, and which is disposed on another axial side of the first outer circumferential surface; and
   an annular step portion which is an annular step portion that is disposed between the first outer circumferential surface and the second outer circumferential surface, and which comprises an edge portion on a side of the first outer circumferential surface, the edge portion being contacted with a part of an inner circumferential surface of the tube when the sleeve is press-inserted into the one longitudinal end portion of the tube.

According to the configuration, when the sleeve is press-inserted into the one longitudinal end portion of the tube, a sealing portion with high sealing force can be formed between the edge portion of the step portion and the tube while the tube is prevented by the edge portion from slipping off, in addition to a sealing portion which is formed between the first outer circumferential surface and the tube.

When the structure of a resin-made pipe joint is used for the tube, in the case where the usage environment is under a high-temperature and high-pressure atmosphere or the period of use is prolonged, the fastening force of the union nut is lowered because of the the creep phenomenon. Even when the sealing property of the sealing portion is lowered due to the lowering of the fastening force, therefore, the sealing property of the sealing portion with high sealing force can be maintained without being lowered.

According to another mode of the invention,
   the step portion has
   a step surface which, when viewing the sleeve in a section containing an axis of the sleeve, extends in a direction that is parallel to or inclined at an acute angle to a direction perpendicular to an axial direction of the sleeve.

According to a further mode of the invention, the step portion has an apex outer circumferential surface which is placed between the edge portion and a maximum outer diameter portion of the first outer circumferential surface, and which, when viewing the sleeve in a section containing an axis of the sleeve, extends approximately in parallel to an axial direction of the sleeve.

According to a still further mode of the invention, the joint body has:

a body cylinder portion in which a flow path for a fluid is formed, the flow path being communicatable with an interior of the tube through the sleeve;

an outer cylinder portion which is coaxially projected from the body cylinder portion in one axial direction of the body cylinder portion so as to be screwable with the union nut; and an inner cylinder portion which is placed radially inside the outer cylinder portion, and which is coaxially projected from the body cylinder portion in a same direction as the outer cylinder portion so as to locate a projection end on a side of the body cylinder portion with respect to a projection end of the outer cylinder portion, and is configured so that a groove portion which opens in one axial direction is formed while being surrounded by the body cylinder portion, the outer cylinder portion, and the inner cylinder portion, and the sleeve has:

a cylindrical inserting portion which is located on another axial side with respect to the second outer circumferential surface, and which is to be inserted into outer cylinder portion;

a cylindrical coupling portion which is projected from the inserting portion in the one axial direction, and which is press-inserted into the one longitudinal end portion of the tube together with the first outer circumferential surface;

a cylindrical press-inserting portion which is coaxially projected from the inserting portion in the other axial direction, and which is press-inserted into the groove portion from an opening portion of the groove portion; and a cylindrical restricting portion which is placed radially inside the press-inserting portion, and which is projected from the inserting portion in a same direction as the press-inserting portion so as to locate a projection end on a side of the inserting portion with respect to the projection end of the press-inserting portion, the restricting portion being configured to, during a process of press-inserting the press-inserting portion into the groove portion, be located radially inside the inner cylinder portion to restrict deformational movement of the inner cylinder portion toward the radially inner side, the inner cylinder portion being pushed by the press-inserting portion.

Effects of the Invention

According to the invention, it is possible to provide a structure of a resin-made pipe joint in which, when the pipe joint is coupled to a tube, the tube hardly slips off, and the sealing property with respect to the tube can be stably ensured.

BRIEF DESCRIPTION OF THE DRAWINGS

FIG. 4 is a partial enlarged sectional view of the sleeve of FIG. 2.

MODE FOR CARRYING OUT THE INVENTION

The structure of a resin-made pipe joint of the invention may be used while, in an apparatus for producing semiconductor devices, liquid crystal devices, organic EL devices, or the like, being disposed between a tube and another tube in order to connect the tubes to each other, or disposed at a tube connecting position of a fluid apparatus such as a valve or a pump in order to connect a tube to the fluid apparatus.

First, the configuration of a structure 1 of a resin-made pipe joint of an embodiment of the invention will be schematically described with reference to the drawings.

Figure 1:
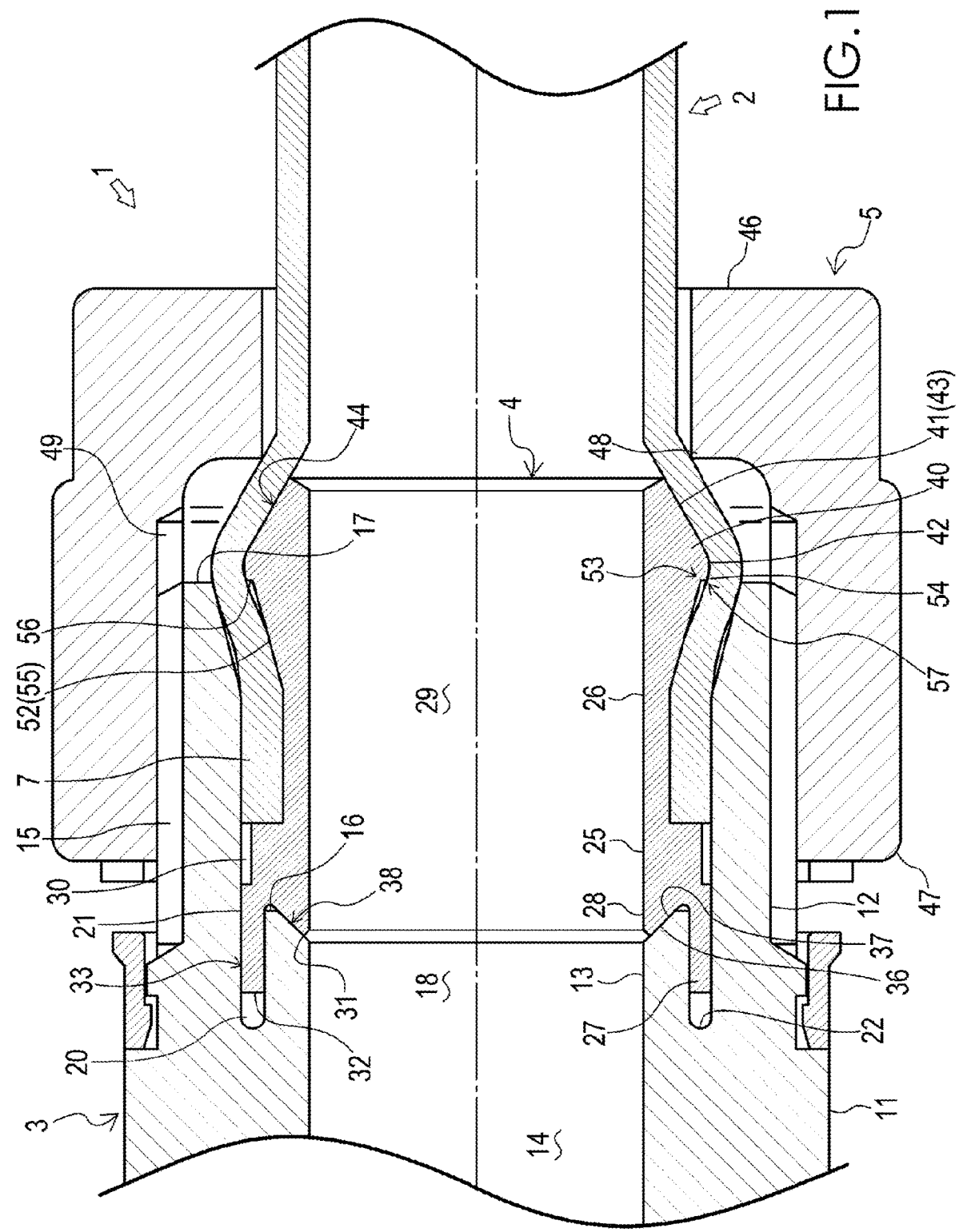
FIG. 1 is a sectional view of a structure of a resin-made pipe joint of an embodiment of the invention.

FIG. 1 is a sectional view of the structure 1 of a resin-made pipe joint. FIG. 1 shows a state where a tube 2 is coupled to the structure 1 of a resin-made pipe joint.

As shown in FIG. 1, the structure 1 of a resin-made pipe joint comprises a joint body 3, a sleeve 4, and a union nut 5. The structure 1 of a resin-made pipe joint is produced by using a synthetic resin such as a fluorine resin. The tube 2 is flexible, and, in the embodiment, produced by using a synthetic resin such as a fluorine resin.

The joint body 3 comprises a body cylinder portion 11, an outer cylinder portion 12, and an inner cylinder portion 13. In the embodiment, the joint body 3 is made of a fluorine resin, and specifically molded by using PFA (perfluoroalkoxy alkane) or PTFE (polytetrafluoroethylene).

The body cylinder portion 11 can be coupled to the sleeve 4, and has a flow path 14 for a fluid in the body cylinder portion 11. In the embodiment, the body cylinder portion 11 is formed into a cylindrical shape. The flow path 14 is disposed so as to have an approximately circular sectional surface, and extend in the body cylinder portion 11 in the axial direction of the body cylinder portion.

The outer cylinder portion 12 is coaxially projected from one axial end portion of the body cylinder portion 11 in one axial direction thereof so as to be screwable with the union nut 5. In the embodiment, the outer cylinder portion 12 is formed into a cylindrical shape. An external thread 15 which is a screwing portion is disposed in the axial direction of the outer cylinder portion 12 on the outer circumferential surface of the outer cylinder portion 12.

The inner cylinder portion 13 is placed radially inside the outer cylinder portion 12. The inner cylinder portion 13 is coaxially projected from the one axial end of the body cylinder portion 11 in the same direction as the outer cylinder portion 12 so that a projection end 16 of the inner cylinder portion is located on the side of the body cylinder portion 11 with respect to a projection end 17 of the outer cylinder portion 12.

In the embodiment, the inner cylinder portion 13 is formed into a cylindrical shape which has an inner diameter that is substantially equal to that of the body cylinder portion 11, and which has an outer diameter that is smaller than the inner diameter of the outer cylinder portion 12. A flow path 18 is disposed so as to have an approximately circular sectional shape, and extend in the inner cylinder portion 13 in the axial direction of the portion, and continuous to the flow path 14.

A groove portion 20 which is surrounded by the body cylinder portion 11, the outer cylinder portion 12, and the inner cylinder portion 13 is disposed in the joint body 3. The groove portion 20 is formed into an annular shape which extends over the whole outer circumferential surface of the inner cylinder portion 13 so that another axial end portion (a press-inserting portion 27 which will be described later) of the sleeve 4 can be press-inserted into the groove portion.

In the embodiment, the groove portion 20 is disposed between the inner cylinder portion 13 and the other axial side of the outer cylinder portion 12 which is opposed to the inner cylinder portion. The groove portion 20 has an opening 21 in the vicinity of the projection end 16 of the inner cylinder portion 13, and a closed portion 22 which is formed into a concavely arcuate shape in a section (longitudinal section) containing the axis of the joint body 3, on the side of the body cylinder portion 11.

The sleeve 4 is configured so as to be press-inserted from the one axial side of the sleeve 4 into one longitudinal (axial) end portion 7 of the tube 2 to flare the one longitudinal end portion 7 and hold the flared state. The sleeve 4 is used for connecting the one longitudinal end portion 7 to the joint body 3.

Specifically, the sleeve 4 comprises an inserting portion 25, a coupling portion 26, the press-inserting portion 27, a restricting portion 28, and an expanding portion 40. A flow path 29 which is connectable to the flow path 18, and which has an approximately circular section is disposed inside the sleeve 4. In the embodiment, the sleeve 4 is made of a fluorine resin, and specifically molded by using PFA or the like.

The inserting portion 25 has a cylindrical shape, and is configured so as to be insertable into the outer cylinder portion 12 of the joint body 3. In the embodiment, the inserting portion 25 is formed into a cylindrical shape which has an outer diameter that is larger than the inner diameter of tube 2, and which has an inner diameter that is substantially equal to the inner diameters of the inner cylinder portion 13 of the joint body 3 and the tube 2.

The coupling portion 26 is formed into a cylindrical shape, configured so as to be projected from the inserting portion 25 in one axial direction, and coaxially press-insertable into the one longitudinal end portion 7 of the tube 2. In the embodiment, the coupling portion 26 is formed into a cylindrical shape which has an inner diameter that is substantially equal to the inner diameters of the inserting portion 25 and the tube 2.

The outer diameter of the coupling portion 26 is set to be smaller than the outer diameter of the inserting portion 25, and larger than the inner diameter of the tube 2. When the coupling portion 26 is press-inserted into the one longitudinal end portion 7 of the tube 2, therefore, the one longitudinal end portion 7 of the tube 2 can be located by the inserting portion 25 while the one longitudinal end portion is flared by the coupling portion 26.

Moreover, the outer diameter of the coupling portion 26 is set so that, when the joint body 3 is to be connected to the one longitudinal end portion 7 of the tube 2 by using the sleeve 4, both the inserting portion 25 and the one longitudinal end portion 7 of the tube 2 in the state where the inserting portion is press-inserted, are inserted into the outer cylinder portion 12 of the joint body 3.

The press-inserting portion 27 is a cylindrical portion, and configured so as to be coaxially projected from the inserting portion 25 in the other axial direction to be press-insertable into the the groove portion 20 through the opening portion 21. In the embodiment, the press-inserting portion 27 is formed into a cylindrical shape which has an inner diameter that is larger than that of the inserting portion 25.

The radial width of the press-inserting portion 27 is set to be larger than the groove width (radial width) of the groove portion 20 so that the press-inserting portion 27 can be press-inserted into the groove portion 20. In the embodiment, the outer diameter of the press-inserting portion 27 is set to have a dimension which is slightly larger than or substantially equal to the inner diameter of the outer cylinder portion 12, and the inner diameter of the press-inserting portion 27 is set to be smaller than the outer diameter of the inner cylinder portion 13.

The outer diameter of the press-inserting portion 27 is set to be larger than that of the inserting portion 25. When the press-inserting portion 27 is press-inserted into the groove portion 20, therefore, an annular gap 30 is formed which is surrounded by the press-inserting portion 27, the inserting portion 25, the outer cylinder portion 12, and the one longitudinal end portion 7 of the tube 2 in the state where the coupling portion 26 is press-inserted.

The restricting portion 28 is formed into a cylindrical shape, and placed on the radially inner side of the sleeve 4 with respect to the press-inserting portion 27. The restricting portion 28 is coaxially projected from the inserting portion 25 in the same direction as the press-inserting portion 27 so that the projection end 31 is located on the side of the inserting portion 25 with respect to the projection end 32 of the press-inserting portion 27.

The restricting portion 28 is configured so as to, in the press-insertion of the press-inserting portion 27 into the groove portion 20 of the joint body 3 from the opening portion 21 toward the closed portion 22, be located radially inside the inner cylinder portion 13 to restrict deformational movement of the inner cylinder portion 13 toward the radially inner side (toward the flow path 18), the inner cylinder portion being pushed by the press-inserting portion 27.

In the embodiment, the restricting portion 28 is formed into a cylindrical shape which has an inner diameter that is substantially equal to that of the inserting portion 25. The outer diameter of the restricting portion 28 is set to be smaller than the inner diameter of the press-inserting portion 27, so as to be able to clamp the side of the projection end 16 of the inner cylinder portion 13 between the restricting portion 28 and one axial direction side of the press-inserting portion 27 which are opposed to each other.

When the press-inserting portion 27 is press-inserted into the groove portion 20, therefore, the restricting portion 28 can support the inner cylinder portion 13 which is caused by the pushing of the press-inserting portion 27 to try to deform and move from the side of the projection end 16 toward the radially inner side with respect to the body cylinder portion 11, on the side of the projection end 16, whereby the deformational movement of the inner cylinder portion 13 to the radially inner side can be restricted.

Then, a first sealing portion 33 which seals between the outer circumferential surface of the press-inserting portion 27 and the inner circumferential surface of the outer cylinder portion 12, and seals between the inner circumferential surface of the press-inserting portion 27 and the outer circumferential surface of the inner cylinder portion 13 is formed by press-inserting the press-inserting portion 27 into the groove portion 20 in the state where the deformational movement of the inner cylinder portion 13 is restricted by the restricting portion 28.

In the embodiment, moreover, the restricting portion 28 is formed into a tapered shape in which the outer diameter of the restricting portion is gradually reduced as further advancing from one axial side toward the other side (the side of the projection end 31). Then, the outer circumferential surface 36 of the restricting portion 28 is formed into a taper-like shape which is buttable against a tapered surface 37 that is disposed in the vicinity of the projection end 16 of the inner cylinder portion 13.

When the press-inserting portion 27 is press-inserted into the groove portion 20, therefore, the taper-like outer circumferential surface 36 of the restricting portion 28, and the tapered surface 37 of the inner cylinder portion 13 are press-contacted with each other, and a second sealing portion 38 which seals between the taper-like outer circumferential surface 36 of the restricting portion 28, and the tapered surface 37 of the inner cylinder portion 13 is formed.

Moreover, the sleeve 4 has a first outer circumferential surface 41. The first outer circumferential surface 41 is formed into a taper-like shape which is more flared as further advancing from one axial side toward the other side in order to flare the one longitudinal end portion 7 of the tube 2. In the embodiment, the first outer circumferential surface 41 is disposed in the expanding portion 40.

The expanding portion 40 is placed on the one axial side of the sleeve 4, and formed into an annular shape so as to expand radially outward from the coupling portion 26. The expanding portion 40 has an annular apex portion 42 having the maximum outer diameter, and a first tapered surface 43 the diameter of which is more reduced as further advancing from the apex portion 42 in one axial direction.

In this way, the first tapered surface 43 functions as the first outer circumferential surface 41 of the sleeve 4, and is configured so that, in the case where the sleeve 4 is press-inserted into the one longitudinal end portion 7 of the tube 2, a part of the one longitudinal end portion 7 of the tube 2 can be flared in the whole circumference so as to extend along the first outer circumferential surface 41, i.e., so as to have a taper-like shape.

When the sleeve 4 is press-inserted into the one longitudinal end portion 7 of the tube 2, therefore, the first outer circumferential surface 41 (the first tapered surface 43) of the sleeve 4 is in surface contact in the press contact state with the inner circumferential surface of the taper-like part of the one longitudinal end portion 7 of the tube 2, and a third sealing portion 44 which seals between the first outer circumferential surface 41 and the one longitudinal end portion 7 of the tube 2 is formed.

The union nut 5 can be fastened to the joint body 3 in order to hold the state where the sleeve 4 which is press-inserted into the one longitudinal end portion 7 of the tube 2 is coupled to joint body 3. The union nut 5 is configured so as to be loosely fittable to the tube 2.

Specifically, the union nut 5 comprises a pressing portion 46 and an outer ring portion 47. In the embodiment, the union nut 5 is configured by a union nut which is made of a fluorine resin, and specifically molded by using, for example, PFA.

The pressing portion 46 is cylindrical, and configured so as to be fittable onto the tube 2 in a manner that the portion is relatively movable in the longitudinal direction of the tube. In the embodiment, the pressing portion 46 is formed into a cylindrical shape having an inner diameter which is slightly larger than the outer diameter of the tube 2. An edge portion 48 is disposed on the inner diameter side in another axial end portion of the pressing portion 46.

The outer ring portion 47 is configured so as to be screwable to the outer cylinder portion 12 of the joint body 3 from the radially outer side. In the embodiment, the outer ring portion 47 is formed into a cylindrical shape having an inner diameter which is larger than that of the pressing portion 46. The outer ring portion 47 is coaxially projected in the other axial direction from the outer diameter side in the other axial end portion of the pressing portion 46.

The inner diameter of the outer ring portion 47 is set to be substantially equal to the outer diameter of the outer cylinder portion 12 in order to be able to surround the outer cylinder portion 12. An internal thread 49 corresponding to the external thread 15 of the outer cylinder portion 12 is disposed on the inner circumferential surface of the outer ring portion 47 along the axial direction of the outer ring portion 47. This enables the outer ring portion 47 to be screwable with the outer cylinder portion 12.

Then, the pressing portion 46 has a configuration where the edge portion 48 presses the sleeve 4 through the taper-like part of the one longitudinal end portion 7 of the tube 2 so that the press-inserting portion 27 is press-inserted into the groove portion 20 by fastening the union nut 5 in the state where the outer ring portion 47 is screwed with the outer cylinder portion 12.

In the case where the union nut 5 is fastened to the outer cylinder portion 12, therefore, a part of the one longitudinal end portion 7 of the tube 2 which is inserted together with the sleeve 4 into the outer cylinder portion 12 is held in a state where the part is pressed against the first outer circumferential surface 41. Consequently, it is possible to prevent the tube 2 from slipping off, and enhance the sealing property in the third sealing portion 44.

In the thus configured structure 1 of a resin-made pipe joint, when the tube 2 is to be coupled to the joint, first, the coupling portion 26 and the expanding portion 40 are press-inserted into the one longitudinal end portion 7 of the tube 2 so that the sleeve 4 is coupled to the tube 2. Then, the sleeve 4 is inserted from the press-inserting portion 27 into the outer cylinder portion 12.

After the insertion of the sleeve 4, the union nut 5 is fastened to the outer cylinder portion 12 to press-insert the press-inserting portion 27 into the groove portion 20, and the restricting portion 28 is press-contacted with the inner cylinder portion 13. Moreover, the edge portion 48 is pressed against the part of the one longitudinal end portion 7 of the tube 2, and the state where the part is pressed against the first outer circumferential surface 41 is maintained.

As a result, the tube 2 can be coupled to the structure 1 of a resin-made pipe joint while the first sealing portion 33 in which the sealing force radially acts, and the second sealing portion 38 in which the sealing force axially acts are formed between the joint body 3 and the sleeve 4, and the third sealing portion 44 is formed between the tube 2 and the sleeve 4.

Next, the sleeve 4 will be described in more detail with reference to the drawings.

Figure 2:
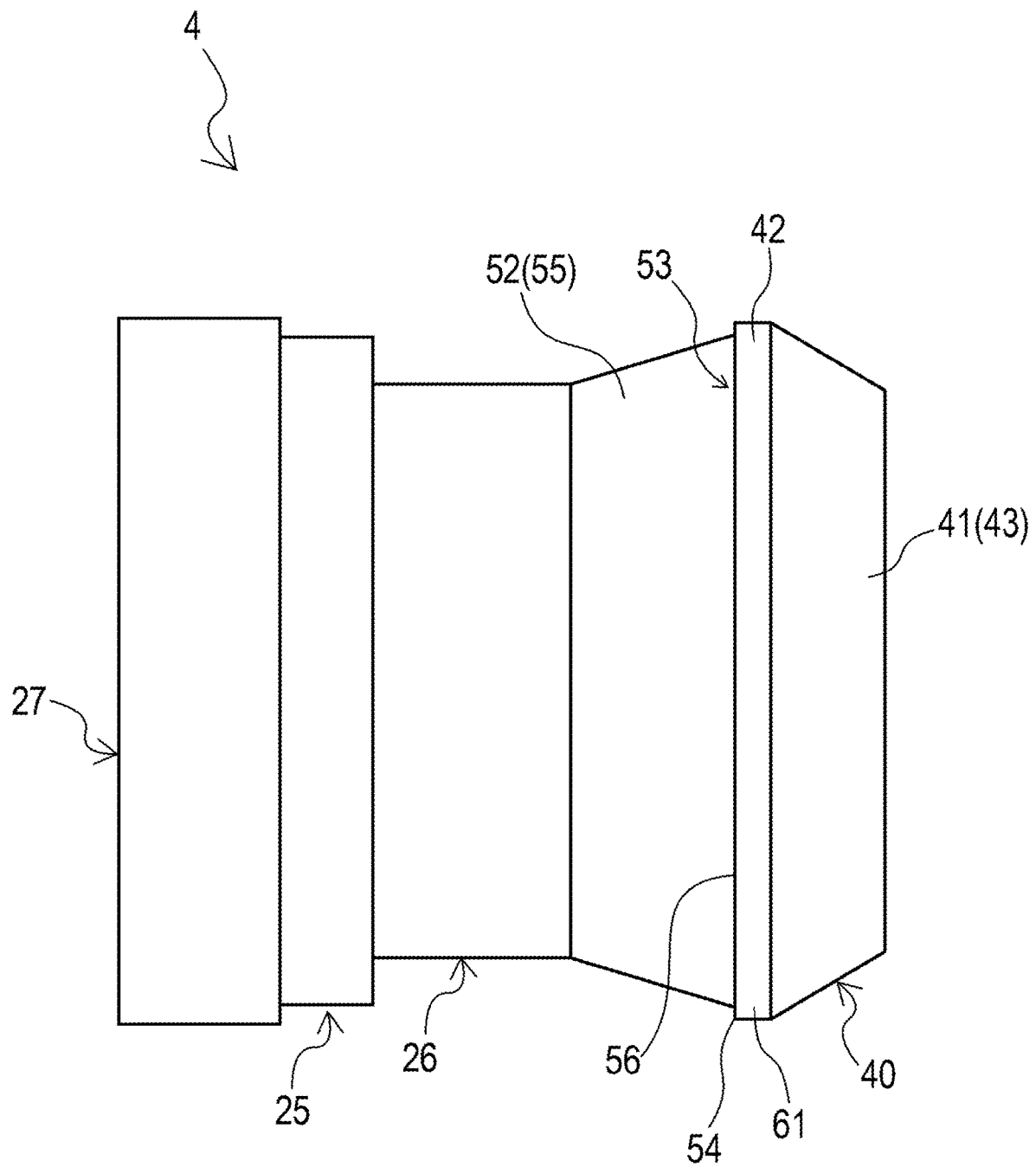
FIG. 2 is a side view of a sleeve in the structure of a resin-made pipe joint of FIG. 1.
Figure 3:
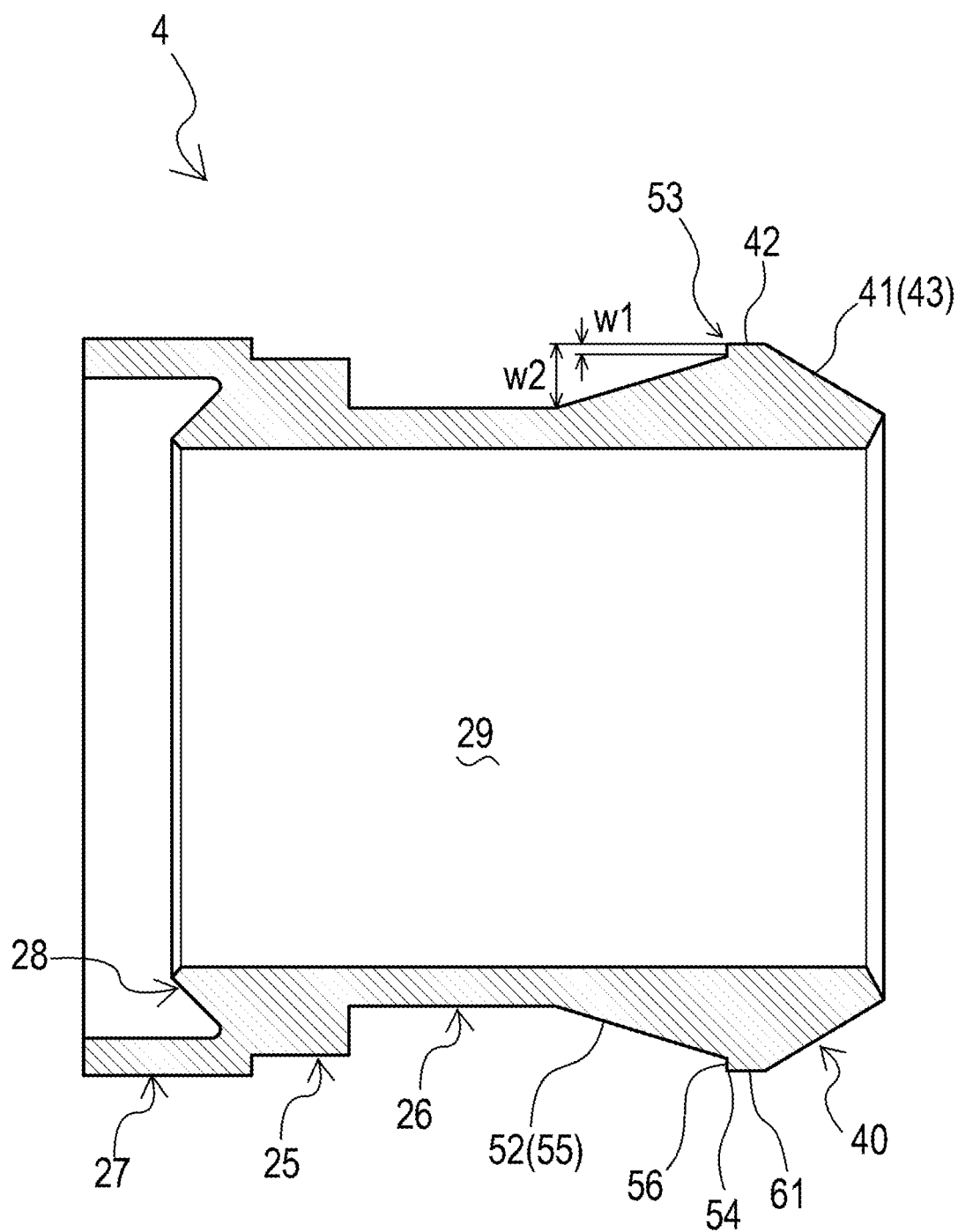
FIG. 3 is a sectional view of the sleeve of FIG. 2.

FIG. 2 is a side view of the sleeve 4. FIG. 3 is a sectional view containing the axis of the sleeve 4. FIG. 4 is a partial enlarged sectional view of the sleeve 4.

As shown in FIGS. 2, 3, and 4, in addition to the first outer circumferential surface 41, the sleeve 4 has a second outer circumferential surface 52 and a step portion 53. The second outer circumferential surface 52 is disposed in the other axial side of the first outer circumferential surface 41, and is formed so as to have an outer diameter which is smaller than the maximum outer diameter of the first outer circumferential surface 41.

The step portion 53 is formed into an annular shape, and disposed between the first outer circumferential surface 41 and the second outer circumferential surface 52. The step portion 53 comprises an edge portion 54 on the side of the first outer circumferential surface 41. The edge portion is contacted with a part of the inner circumferential surface of the tube 2 when the sleeve 4 is press-inserted into the one longitudinal end portion 7 of the tube 2.

In the embodiment, the second outer circumferential surface 52 is placed on one axial side with respect to the inserting portion 25 and provided in the expanding portion 40. Namely, the expanding portion 40 is formed so as to have, in addition to the apex portion 42 and the first tapered surface 43, a second tapered surface 55 the diameter of which is more reduced as further advancing from the vicinity of the apex portion 42 in the other axial direction.

In this way, the second tapered surface 55 functions as the second outer circumferential surface 52, and is configured so that, in the case where the sleeve 4 is press-inserted into the one longitudinal end portion 7 of the tube 2, the second outer circumferential surface is surrounded in the whole circumference by a part of the one longitudinal end portion 7 of the tube 2 that is guided through the first outer circumferential surface 41.

The step portion 53 has a step surface 56 which is disposed along a planar surface that intersects (here, is orthogonal to) the axial direction of the sleeve 4. The step surface 56 is formed into an annular shape so as to, as viewed in the axial direction of the sleeve 4, be sandwiched between the maximum outer diameter portion (the apex portion 42) of the first outer circumferential surface 41 and that of the second outer circumferential surface 52.

Here, the radial width w1 of the step surface 56 is set to a size which is arbitrarily selected in a range of about 0.01 mm or more to a size (corresponding to the size of w2 in FIG. 3) of ½ or less of a value that is obtained by subtracting the outer diameter of the minimum outer diameter portion of the second outer circumferential surface 52 from the outer diameter of the maximum outer diameter portion (the apex portion 42) of the first outer circumferential surface 41.

In this way, when the sleeve 4 is press-inserted into the one longitudinal end portion 7 of the tube 2, the edge portion 54 of the step portion 53 is contacted in the press contact state with a part of the inner circumferential surface of the one longitudinal end portion 7 of the tube 2, on the other axial side with respect to the third sealing portion 44, to form a fourth sealing portion 57 for sealing between the edge portion 54 and the one longitudinal end portion 7 of the tube 2.

In this case, namely, the one longitudinal end portion 7 of the tube 2 has a state where the portion is flaringly pushed by the sleeve 4, and applies an embracing force to the sleeve 4. Therefore, stress of the sleeve 4 against the force concentrates in the edge portion 54. As a result, the fourth sealing portion 57 is formed. Moreover, a state is formed where the edge portion 54 bites into a part of the one longitudinal end portion 7 of the tube 2.

From the above, when the sleeve 4 is press-inserted into the one longitudinal end portion 7 of the tube 2, in addition to the third sealing portion 44 which is formed between the first outer circumferential surface 41 and the tube 2, the fourth sealing portion 57 which is formed between the edge portion 54 and the tube 2 can be caused to function as a sealing portion with high sealing force, while the tube 2 is prevented by the edge portion 54 from slipping off.

In the case where, when the structure 1 of a resin-made pipe joint is used, the usage environment is under a high-temperature and high-pressure atmosphere or the period of use is prolonged, the fastening force of the union nut 5 is lowered because of the creep phenomenon. Even when the sealing property of the third sealing portion 44 is lowered in response to the lowering of the fastening force, therefore, the sealing property of the fourth sealing portion 57 is not lowered but can be maintained. When the tube 2 is coupled to the structure 1 of a resin-made pipe joint, consequently, the tube 2 can be made difficult to slip off the sleeve 4, and the sealing property between the sleeve 4 and the tube 2 can be more stably ensured.

In the embodiment, as shown in FIGS. 2, 3, and 4, moreover, the step portion 53 has an apex outer circumferential surface 61. The apex outer circumferential surface 61 is placed between the edge portion 54 and a maximum outer diameter portion 63 of the first outer circumferential surface 41, and formed so as to, when viewing the sleeve 4 in a section (longitudinal section) containing the axis of the sleeve 4, extend approximately in parallel to the axial direction of the sleeve 4.

Here, the apex outer circumferential surface 61 which extends approximately in parallel to the axial direction of the sleeve 4 includes also a surface which is slightly curved in the axial direction of the sleeve 4, as far as the edge portion 54 is not impeded from contacting with a part of the inner circumferential surface of the tube 2 when the sleeve 4 is press-inserted into the one longitudinal end portion 7 of the tube 2.

In the embodiment, the apex outer circumferential surface 61 is provided in the apex portion 42 of the expanding portion 40. The apex outer circumferential surface 61 is formed so as to have an axial width which is smaller than that of the first outer circumferential surface 41. The apex outer circumferential surface 61 cooperates with the step surface 56 which is continuous thereto, to form the edge portion 54 having a rectangular section.

Although, in the embodiment, as shown in FIG. 4, the edge portion 54 exhibits a rectangular section, the edge portion may have an acute angle section or an obtuse angle section as viewing the sleeve 4 in a section (longitudinal section) containing the axis.

Figure 5A:
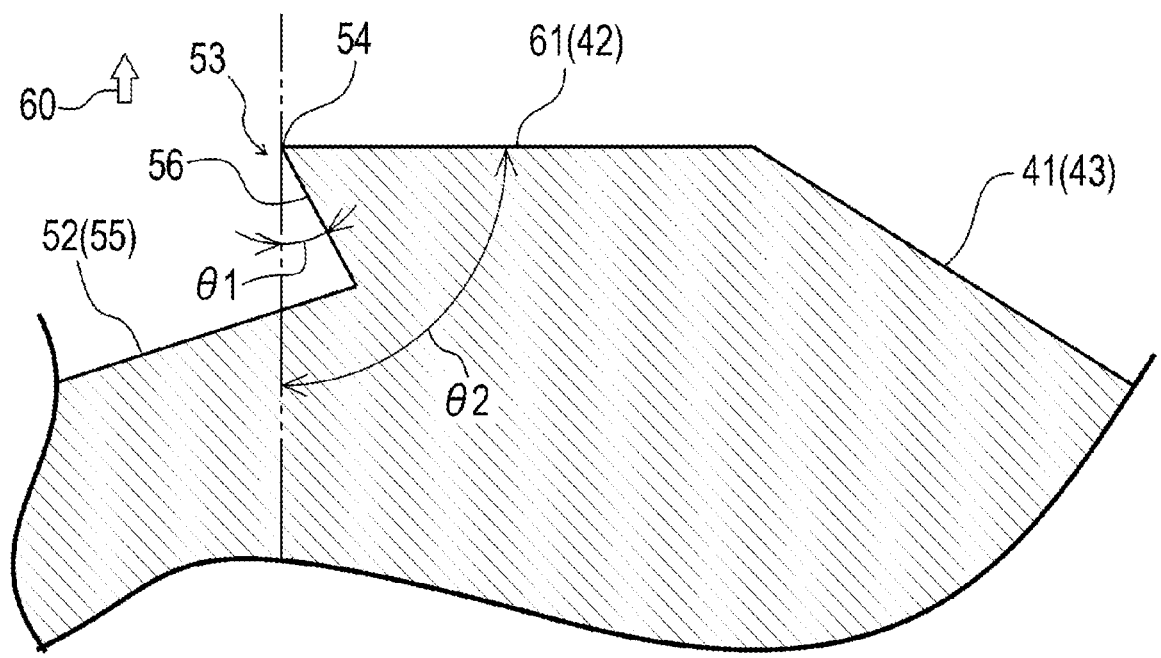
FIG. 5(a) is a partial enlarged sectional view of another example of the sleeve in the structure of a resin-made pipe joint of FIG. 1.

As shown in FIG. 5(a), for example, the step surface 56 extends from the side of the edge portion 54 toward the second outer circumferential surface 52 in a direction inclined at an acute angle so that the step surface 56 forms a predetermined angle $\theta 1$ on the one axial side in a section view with respect to a direction (the direction of the arrow 60) perpendicular to the axial direction of the sleeve 4, whereby the edge portion 54 can be formed to have an acute angle section (i.e., the angle formed by the step surface 56 and the apex outer circumferential surface 61 is an acute angle). In this case, the predetermined angle $\theta 1$ is preferably larger than 0° and smaller than the angle $\theta 2$ formed by the apex outer circumferential surface 61 with respect to the direction (direction of the arrow 60) perpendicular to the axial direction, and more preferably in a range of 0° to 30°.

Figure 5B:
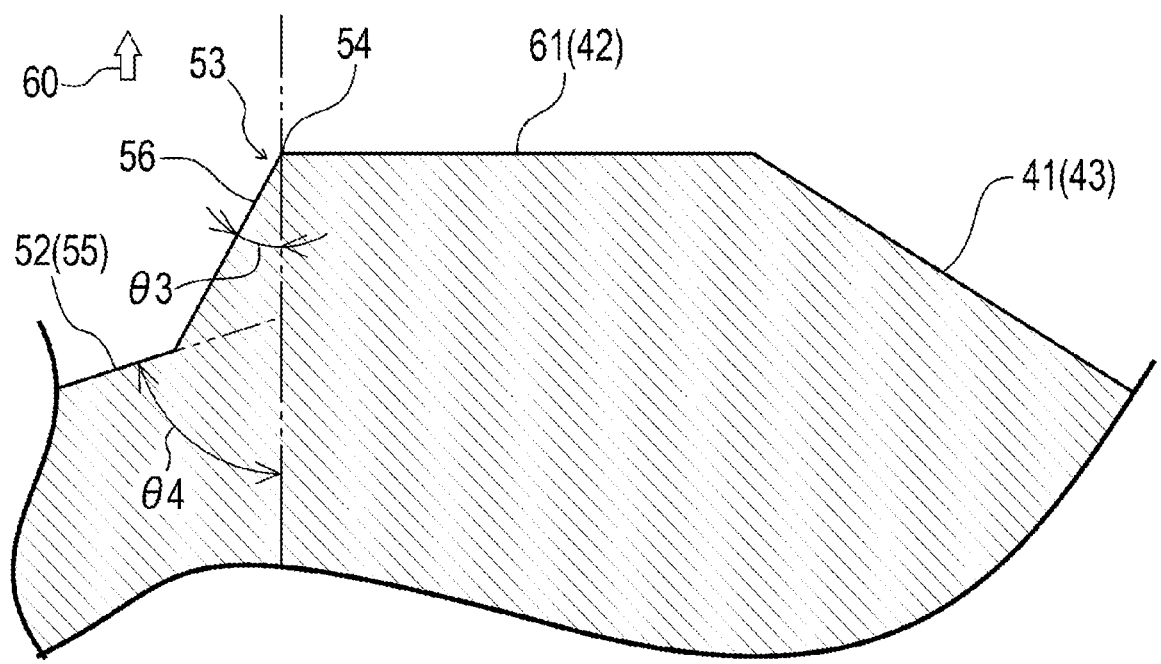
FIG. 5(b) is a partial enlarged sectional view of a further example of the sleeve in the structure of a resin-made pipe joint of FIG. 1.

As shown in FIG. 5(b), alternatively, the step surface 56 extends from the side of the edge portion 54 toward the second outer circumferential surface 52 in a direction inclined at an acute angle so that the step surface 56 forms a predetermined angle $\theta 2$ on the other axial side in a section view with respect to the direction (direction of the arrow 60) perpendicular to the axial direction of the sleeve 4, whereby the edge portion 54 can be formed to have an obtuse angle section (i.e., the angle formed by the step surface 56 and the apex outer circumferential surface 61 is an obtuse angle). In this case, the predetermined angle θ3 is preferably larger than 0° and smaller than the angle θ4 formed by the second outer circumferential surface 52 with respect to the direction (direction of the arrow 60) perpendicular to the axial direction, and more preferably in a range of 0° to 30°.

DESCRIPTION OF REFERENCE NUMERALS 1 resin-made pipe joint
2 tube
3 joint body
4 sleeve
5 union nut
7 one longitudinal end portion of tube
11 body cylinder portion
12 outer cylinder portion
13 inner cylinder portion
20 groove portion
25 inserting portion
26 coupling portion
27 press-inserting portion
28 restricting portion
41 first outer circumferential surface
52 second outer circumferential surface
53 step portion
54 edge portion
56 step surface
61 apex outer circumferential surface

The invention claimed is:

1. A structure of a resin-made pipe joint comprising:
a sleeve which is press-insertable from one axial side into one longitudinal end portion of a flexible tube so as to flare the one longitudinal end portion of the tube to hold the flared state;
a joint body which is couplable to the sleeve; and
a union nut which is fastenable to the joint body to hold a state where the sleeve that is press-inserted into the one longitudinal end portion of the tube is coupled to the joint body, wherein
the sleeve has:
a tapered first outer circumferential surface having larger outer diameters at larger distances from the one axial side toward another axial side in order to flare the one longitudinal end portion of the tube;
a tapered second outer circumferential surface having smaller outer diameters at larger distances from the one axial side toward another axial side, the second outer circumferential surface has a maximum outer diameter that is smaller than a maximum outer diameter of the first outer circumferential surface, and which is disposed on another axial side of the first outer circumferential surface; and
an annular step portion which is disposed between the first outer circumferential surface and the second outer circumferential surface, which has a radial width no more than a half of a difference between the maximum outer diameter of the first outer circumferential surface and a minimum outer diameter of the second outer circumferential surface, and which comprises an edge portion on a side of the first outer circumferential surface, the edge portion being contacted with a part of an inner circumferential surface of the tube when the sleeve is press-inserted into the one longitudinal end portion of the tube,
wherein the step portion has an apex outer circumferential surface which is placed between the edge portion and a maximum outer diameter portion of the first outer circumferential surface, and which, when viewing the sleeve in a section containing an axis of the sleeve, extends approximately in parallel to an axial direction of the sleeve.

2. The structure of a resin-made pipe joint according to claim 1, wherein
the joint body has:
a body cylinder portion in which a flow path for a fluid is formed, the flow path being communicatable with an interior of the tube through the sleeve;
an outer cylinder portion which is coaxially projected from the body cylinder portion in one axial direction of the body cylinder portion so as to be screwable with the union nut; and
an inner cylinder portion which is placed radially inside the outer cylinder portion, and which is coaxially projected from the body cylinder portion in a same direction as the outer cylinder portion so as to locate a projection end on a side of the body cylinder portion with respect to a projection end of the outer cylinder portion, and
is configured so that a groove portion which opens in one axial direction is formed while being surrounded by the body cylinder portion, the outer cylinder portion, and the inner cylinder portion, and
the sleeve has:
a cylindrical inserting portion which is located on another axial side with respect to the second outer circumferential surface, and which is to be inserted into the outer cylinder portion;
a cylindrical coupling portion which is projected from the inserting portion in the one axial direction, and which is press-inserted into the one longitudinal end portion of the tube together with the first outer circumferential surface;
a cylindrical press-inserting portion which is coaxially projected from the inserting portion in the other axial direction, and which is press-inserted into the groove portion from an opening portion of the groove portion; and
a cylindrical restricting portion which is placed radially inside the press-inserting portion, and which is projected from the inserting portion in a same direction as the press-inserting portion so as to locate a projection end on a side of the inserting portion with respect to the projection end of the press-inserting portion,
the restricting portion being configured to, during a process of press-inserting the press-inserting portion into the groove portion, be located radially inside the inner cylinder portion to restrict deformational movement of the inner cylinder portion toward the radially inner side, the inner cylinder portion being pushed by the press-inserting portion.

3. A structure of a resin-made pipe joint comprising:
a sleeve which is press-insertable from one axial side into one longitudinal end portion of a flexible tube so as to flare the one longitudinal end portion of the tube to hold the flared state;
a joint body which is couplable to the sleeve; and
a union nut which is fastenable to the joint body to hold a state where the sleeve that is press-inserted into the one longitudinal end portion of the tube is coupled to the joint body, wherein the sleeve has:
a tapered first outer circumferential surface having larger outer diameters at larger distances from the one axial side toward another axial side in order to flare the one longitudinal end portion of the tube;
a tapered second outer circumferential surface having smaller outer diameters at larger distances from the one axial side toward another axial side, the second outer circumferential surface has a maximum outer diameter that is smaller than a maximum outer diameter of the first outer circumferential surface, and which is disposed on another axial side of the first outer circumferential surface; and
an annular step portion which is disposed between the first outer circumferential surface and the second outer circumferential surface, which has a radial width no more than a half of a difference between the maximum outer diameter of the first outer circumferential surface and a minimum outer diameter of the second outer circumferential surface, and which comprises an edge portion on a side of the first outer circumferential surface, the edge portion being contacted with a part of an inner circumferential surface of the tube when the sleeve is press-inserted into the one longitudinal end portion of the tube,
wherein the joint body has:
a body cylinder portion in which a flow path for a fluid is formed, the flow path being communicatable with an interior of the tube through the sleeve;
an outer cylinder portion which is coaxially projected from the body cylinder portion in an axial direction of the body cylinder portion so as to be screwable with the union nut; and
an inner cylinder portion which is placed radially inside the outer cylinder portion, and which is coaxially projected from the body cylinder portion in a same direction as the outer cylinder portion so as to locate a projection end on a side of the body cylinder portion with respect to a projection end of the outer cylinder portion, and
is configured so that a groove portion which opens in one axial direction is formed while being surrounded by the body cylinder portion, the outer cylinder portion, and the inner cylinder portion, and
the sleeve has:
a cylindrical inserting portion which is located on another axial side with respect to the second outer circumferential surface, and which is to be inserted into the outer cylinder portion;
a cylindrical coupling portion which is projected from the inserting portion in the one axial direction, and which is press-inserted into the one longitudinal end portion of the tube together with the first outer circumferential surface;
a cylindrical press-inserting portion which is coaxially projected from the inserting portion in the other axial direction, and which is press-inserted into the groove portion from an opening portion of the groove portion; and
a cylindrical restricting portion which is placed radially inside the press-inserting portion, and which is projected from the inserting portion in a same direction as the press-inserting portion so as to locate a projection end on a side of the inserting portion with respect to the projection end of the press-inserting portion,
the restricting portion being configured to, during a process of press-inserting the press-inserting portion into the groove portion, be located radially inside the inner cylinder portion to restrict deformational movement of the inner cylinder portion toward the radially inner side, the inner cylinder portion being pushed by the press-inserting portion.

4. A structure of a resin-made pipe joint comprising:
a sleeve which is press-insertable from one axial side into one longitudinal end portion of a flexible tube so as to flare the one longitudinal end portion of the tube to hold the flared state;
a joint body which is couplable to the sleeve; and
a union nut which is fastenable to the joint body to hold a state where the sleeve that is press-inserted into the one longitudinal end portion of the tube is coupled to the joint body, wherein
the sleeve has:
a tapered first outer circumferential surface having larger outer diameters at larger distances from the one axial side toward another axial side in order to flare the one longitudinal end portion of the tube;
a tapered second outer circumferential surface having smaller outer diameters at larger distances from the one axial side toward another axial side, the second outer circumferential surface has a maximum outer diameter that is smaller than a maximum outer diameter of the first outer circumferential surface, and which is disposed on another axial side of the first outer circumferential surface; and
an annular step portion which is disposed between the first outer circumferential surface and the second outer circumferential surface, which has a radial width no more than a half of a difference between the maximum outer diameter of the first outer circumferential surface and a minimum outer diameter of the second outer circumferential surface, and which comprises an edge portion on a side of the first outer circumferential surface, the edge portion being contacted with a part of an inner circumferential surface of the tube when the sleeve is press-inserted into the one longitudinal end portion of the tube,
wherein the step portion has a step surface which, when viewing the sleeve in a section containing an axis of the sleeve, extends in a direction that is parallel to or inclined at an acute angle to a direction perpendicular to an axial direction of the sleeve, and
wherein the joint body has:
a body cylinder portion in which a flow path for a fluid is formed, the flow path being communicatable with an interior of the tube through the sleeve;
an outer cylinder portion which is coaxially projected from the body cylinder portion in an axial direction of the body cylinder portion so as to be screwable with the union nut; and
an inner cylinder portion which is placed radially inside the outer cylinder portion, and which is coaxially projected from the body cylinder portion in a same direction as the outer cylinder portion so as to locate a projection end on a side of the body cylinder portion with respect to a projection end of the outer cylinder portion, and
is configured so that a groove portion which opens in one axial direction is formed while being surrounded by the body cylinder portion, the outer cylinder portion, and the inner cylinder portion, and the sleeve has:
a cylindrical inserting portion which is located on another axial side with respect to the second outer circumferential surface, and which is to be inserted into the outer cylinder portion;
a cylindrical coupling portion which is projected from the inserting portion in the one axial direction, and which is press-inserted into the one longitudinal end portion of the tube together with the first outer circumferential surface;
a cylindrical press-inserting portion which is coaxially projected from the inserting portion in the other axial direction, and which is press-inserted into the groove portion from an opening portion of the groove portion; and
a cylindrical restricting portion which is placed radially inside the press-inserting portion, and which is projected from the inserting portion in a same direction as the press-inserting portion so as to locate a projection end on a side of the inserting portion with respect to the projection end of the press-inserting portion,
the restricting portion being configured to, during a process of press-inserting the press-inserting portion into the groove portion, be located radially inside the inner cylinder portion to restrict deformational movement of the inner cylinder portion toward the radially inner side, the inner cylinder portion being pushed by the press-inserting portion.

5. A structure of a resin-made pipe joint comprising:
a sleeve which is press-insertable from one axial side into one longitudinal end portion of a flexible tube so as to flare the one longitudinal end portion of the tube to hold the flared state;
a joint body which is couplable to the sleeve; and
a union nut which is fastenable to the joint body to hold a state where the sleeve that is press-inserted into the one longitudinal end portion of the tube is coupled to the joint body, wherein
the sleeve has:
a tapered first outer circumferential surface having larger outer diameters at larger distances from the one axial side toward another axial side in order to flare the one longitudinal end portion of the tube;
a tapered second outer circumferential surface having smaller outer diameters at larger distances from the one axial side toward another axial side, the second outer circumferential surface has a maximum outer diameter that is smaller than a maximum outer diameter of the first outer circumferential surface, and which is disposed on another axial side of the first outer circumferential surface; and
an annular step portion which is disposed between the first outer circumferential surface and the second outer circumferential surface, which has a radial width no more than a half of a difference between the maximum outer diameter of the first outer circumferential surface and a minimum outer diameter of the second outer circumferential surface, and which comprises an edge portion on a side of the first outer circumferential surface, the edge portion being contacted with a part of an inner circumferential surface of the tube when the sleeve is press-inserted into the one longitudinal end portion of the tube,
wherein the step portion has a step surface which, when viewing the sleeve in a section containing an axis of the sleeve, extends in a direction that is parallel to or inclined at an acute angle to a direction perpendicular to an axial direction of the sleeve, and
wherein the step portion has an apex outer circumferential surface which is placed between the edge portion and a maximum outer diameter portion of the first outer circumferential surface, and which, when viewing the sleeve in a section containing an axis of the sleeve, extends approximately in parallel to an axial direction of the sleeve.

6. The structure of a resin-made pipe joint according to claim 5, wherein
the joint body has:
a body cylinder portion in which a flow path for a fluid is formed, the flow path being communicatable with an interior of the tube through the sleeve;
an outer cylinder portion which is coaxially projected from the body cylinder portion in one axial direction of the body cylinder portion so as to be screwable with the union nut; and
an inner cylinder portion which is placed radially inside the outer cylinder portion, and which is coaxially projected from the body cylinder portion in a same direction as the outer cylinder portion so as to locate a projection end on a side of the body cylinder portion with respect to a projection end of the outer cylinder portion, and
is configured so that a groove portion which opens in one axial direction is formed while being surrounded by the body cylinder portion, the outer cylinder portion, and the inner cylinder portion, and
the sleeve has:
a cylindrical inserting portion which is located on another axial side with respect to the second outer circumferential surface, and which is to be inserted into the outer cylinder portion;
a cylindrical coupling portion which is projected from the inserting portion in the one axial direction, and which is press-inserted into the one longitudinal end portion of the tube together with the first outer circumferential surface;
a cylindrical press-inserting portion which is coaxially projected from the inserting portion in the other axial direction, and which is press-inserted into the groove portion from an opening portion of the groove portion; and
a cylindrical restricting portion which is placed radially inside the press-inserting portion, and which is projected from the inserting portion in a same direction as the press-inserting portion so as to locate a projection end on a side of the inserting portion with respect to the projection end of the press-inserting portion,
the restricting portion being configured to, during a process of press-inserting the press-inserting portion into the groove portion, be located radially inside the inner cylinder portion to restrict deformational movement of the inner cylinder portion toward the radially inner side, the inner cylinder portion being pushed by the press-inserting portion.

* * * * *